(12) United States Patent
Wang et al.

(10) Patent No.: US 12,266,091 B2
(45) Date of Patent: Apr. 1, 2025

(54) DEFECT DETECTION METHOD AND APPARATUS, AND COMPUTER-READABLE STORAGE MEDIUM

(71) Applicant: CONTEMPORARY AMPEREX TECHNOLOGY (HONG KONG) LIMITED, Hong Kong (CN)

(72) Inventors: Zhiyu Wang, Ningde (CN); Xi Wang, Ningde (CN); Guannan Jiang, Ningde (CN)

(73) Assignee: CONTEMPORARY AMPEREX TECHNOLOGY CO., LIMITE, Hong Kong (CN)

( * ) Notice: Subject to any disclaimer, the term of this patent is extended or adjusted under 35 U.S.C. 154(b) by 0 days.

(21) Appl. No.: 18/356,232

(22) Filed: Jul. 21, 2023

(65) Prior Publication Data
US 2024/0070840 A1    Feb. 29, 2024

Related U.S. Application Data

(63) Continuation of application No. PCT/CN2022/115774, filed on Aug. 30, 2022.

(51) Int. Cl.
*G06T 7/00* (2017.01)
(52) U.S. Cl.
CPC .. *G06T 7/0004* (2013.01); *G06T 2207/20084* (2013.01)
(58) Field of Classification Search
CPC ............ G06T 7/0004; G06T 2207/20084
See application file for complete search history.

(56) References Cited

U.S. PATENT DOCUMENTS 11,153,566 B1 * 10/2021 Tao ............... H04N 19/124
11,762,199 B2 * 9/2023 Bouchier ........... G06T 19/006
345/633

(Continued)

FOREIGN PATENT DOCUMENTS

CN   110136116 A   8/2019
CN   110349133 A   10/2019

(Continued)

OTHER PUBLICATIONS

International search report received in the corresponding international application PCT/CN2022/115774, mailed May 29, 2023.

(Continued)

*Primary Examiner* — Bobbak Safaipour
(74) *Attorney, Agent, or Firm* — Kilpatrick Townsend & Stockton LLP

(57) ABSTRACT

Provided are a defect detection method and apparatus, and a computer-readable storage medium. Specifically, the method includes: obtaining a to-be-detected image; obtaining a feature map of the to-be-detected image based on the to-be-detected image, where the feature map of the to-be-detected image includes a feature map of spatial position coordinate information; and performing defect detection on the to-be-detected image based on the feature map of the to-be-detected image. By modifying a neural network structure of defect detection and extracting the feature map of spatial position coordinate information during the detection, this application makes the neural network for use of defect detection sensitive to a spatial position, thereby enhancing sensitivity of a detection neural network to the spatial position, and in turn, increasing accuracy of detecting some specific defect types by the detection neural network, and increasing accuracy of defect detection.

10 Claims, 4 Drawing Sheets

(56) References Cited

U.S. PATENT DOCUMENTS

| | | | |
|---|---|---|---|
| 2020/0025690 A1* | 1/2020 | Koshihara | G06F 18/2433 |
| 2022/0027728 A1* | 1/2022 | Han | G06V 10/764 |
| 2022/0050061 A1* | 2/2022 | Bar | G06T 7/0004 |
| 2022/0198228 A1 | 6/2022 | Kuo et al. | |
| 2023/0144433 A1* | 5/2023 | Zhang | G06N 3/0464 |
| | | | 382/157 |
| 2023/0237763 A1* | 7/2023 | Wang | G06V 10/764 |
| | | | 382/190 |
| 2023/0267716 A1* | 8/2023 | Jiang | G06V 10/945 |
| 2023/0288345 A1* | 9/2023 | Bar | G03F 7/706841 |

FOREIGN PATENT DOCUMENTS

| | | |
|---|---|---|
| CN | 113591840 A | 11/2021 |
| CN | 113781434 A | 12/2021 |
| CN | 114648480 A | 6/2022 |
| WO | 2022121531 A1 | 6/2022 |

OTHER PUBLICATIONS

Written opinion received in the corresponding international application PCT/CN2022/115774, mailed May 29, 2023.

The extended European search report received in the corresponding European application 22871168.5, mailed Apr. 9, 2024.

Li Yiting et al: "Research on a Product Quality Monitoring Method Based on Multi Scale PP-YOLO", IEEE Access, IEEE USA, vol. 9, Jun. 2, 2021 (Jun. 2, 2021), pp. 80373-80387.

Wang Shuai et al: "Automatic Detection and Classification of Steel Surface Defect Using Deep Convolutional Neural Networks", Metals, vol. 11, No. 3, Feb. 26, 2021 (Feb. 26, 2021), pp. 1-22.

Rosanne Liu et al: "Intriguing Failing of Convolutional Neural Networks and the CoordConv Solution", ARXIV. Org, Cornell University Library, 201 Olin Library Cornell University Ithaca, NY 14853, Jul. 9, 2018 (Jul. 9, 2018).

* cited by examiner

DEFECT DETECTION METHOD AND APPARATUS, AND COMPUTER-READABLE STORAGE MEDIUM

CROSS-REFERENCE TO RELATED APPLICATIONS

This application is a continuation of International Application PCT/CN2022/115774, filed Aug. 30, 2022 and entitled "DEFECT DETECTION METHOD AND APPARATUS, AND COMPUTER-READABLE STORAGE MEDIUM", which is incorporated herein by reference in its entirety.

TECHNICAL FIELD

This application relates to the technical field of image processing, and in particular, to a defect detection method and apparatus, and a computer-readable storage medium.

BACKGROUND

In a modern industrial production process, some defects may exist in a product due to factors such as a production process and equipment. Therefore, the product needs to be inspected by various means to detect defects and improve the yield rate of the product.

However, during product inspection, because the defects are position-sensitive, convolutional neural network detection needs to be performed in combination with logical post-processing, thereby resulting in relatively low detection efficiency. Therefore, it is urgent to improve the efficiency of product defect detection.

SUMMARY

This application provides a defect detection method and apparatus, and a computer-readable storage medium to increase sensitivity of a detection neural network to a spatial position, and in turn, increase accuracy of detecting some specific defect types by the detection neural network, and increase accuracy of defect detection.

According to a first aspect, a defect detection method is provided. The method includes: obtaining a to-be-detected image; obtaining a feature map of the to-be-detected image based on the to-be-detected image, where the feature map of the to-be-detected image includes a feature map of spatial position coordinate information; and performing defect detection on the to-be-detected image based on the feature map of the to-be-detected image.

By modifying a neural network structure of defect detection and extracting the feature map of spatial position coordinate information during the detection, the technical solution of this application makes the neural network for use of defect detection sensitive to a spatial position, thereby enhancing sensitivity of a detection neural network to the spatial position, and in turn, increasing accuracy of detecting some specific defect types by the detection neural network, and increasing accuracy of defect detection.

In some possible implementations, the feature map of the to-be-detected image further includes an image information feature map. The obtaining a feature map of the to-be-detected image based on the to-be-detected image includes: obtaining the image information feature map based on the to-be-detected image; and generating the feature map of the spatial position coordinate information based on the image information feature map, where a number of dimensions of the feature map of the spatial position coordinate information is identical to a number of dimensions of the image information feature map.

In the foregoing implementations, the image information feature map is obtained first, and then the feature map of the spatial position coordinate information is obtained based on the image information feature map. In this way, the number of dimensions is identical between the two types of feature maps, thereby facilitating subsequent image processing and improving accuracy of defect detection.

In some possible implementations, the generating the feature map of the spatial position coordinate information based on the image information feature map includes: generating a linear value corresponding to the spatial position coordinate information; generating a first coordinate network based on the linear value; and increasing a number of dimensions of the first coordinate network based on the image information feature map, so as to generate the feature map of the spatial position coordinate information.

In the foregoing implementations, the feature map of the spatial position coordinate information is generated by generating a coordinate network corresponding to the spatial position coordinate information. In this way, the position feature map is spliced into the image information feature map. The combination of the two feature maps enhances sensitivity to the spatial information, and improves accuracy of defect detection.

In some possible implementations, the performing defect detection on the to-be-detected image based on the feature map of the to-be-detected image includes: performing, based on the feature map of the to-be-detected image, defect detection on the to-be-detected image by using a filter model, where the filter model includes a filter configured to process the feature map of the spatial position coordinate information.

In the foregoing implementation, a filter corresponding to the feature map of the spatial position coordinate information is added in subsequent detection, thereby facilitating defect detection and increasing accuracy of defect detection.

In some possible implementations, the filter is a filter of a $1^{st}$ convolutional layer.

In some possible implementations, the feature map of the spatial position coordinate information includes at least one of a feature map of coordinate information in an x-axis direction, a feature map of coordinate information in a y-axis direction, or a feature map of coordinate information in a z-axis direction.

In the foregoing implementations, by defining that the feature map of the spatial position coordinate information is a feature map of coordinate information in at least one of an x-axis direction, a y-axis direction, or a z-axis direction, this embodiment provides a plurality of space sensitivity types, thereby facilitating defect detection and increasing accuracy of defect detection.

In some possible implementations, the method is used for defect detection of tabs and/or electrode plates.

The foregoing implementations can improve the production efficiency of power batteries when applied to defect detection of tabs/electrode plates in the power batteries.

In some possible implementations, when the method is used for defect detection of tabs, the defect detection of tabs includes detection of defects of a tab fold feature.

Because the tab fold feature is position-sensitive, the foregoing implementation can increase detection accuracy when applied to detection of fold defects.

In some possible implementations, the obtaining a feature map of the to-be-detected image based on the to-be-detected image includes: inputting the to-be-detected image into a neural network; and extracting, through a backbone network of the neural network, a defect feature vector and extracting a coordinate information feature corresponding to the defect feature vector, so as to obtain the feature map of the to-be-detected image.

By simultaneously extracting the defect feature vector and the corresponding coordinate feature, the foregoing implementation can improve accuracy of defect detection.

According to a second aspect, a defect detection apparatus is provided. The apparatus includes: an obtaining unit, configured to obtain a to-be-detected image; and a processing unit, configured to obtain a feature map of the to-be-detected image based on the to-be-detected image. The feature map of the to-be-detected image includes a feature map of spatial position coordinate information. The processing unit is further configured to perform defect detection on the to-be-detected image based on the feature map of the to-be-detected image.

By modifying a neural network structure of defect detection and extracting the feature map of spatial position coordinate information during the detection, the technical solution of this application makes the neural network for use of defect detection sensitive to a spatial position, thereby enhancing sensitivity of a detection neural network to the spatial position, and in turn, increasing accuracy of detecting some specific defect types by the detection neural network, and increasing accuracy of defect detection.

In some possible implementations, the feature map of the to-be-detected image further includes an image information feature map, and the processing unit is configured to: obtain the image information feature map based on the to-be-detected image; and generate the feature map of the spatial position coordinate information based on the image information feature map. The number of dimensions of the feature map of the spatial position coordinate information is identical to the number of dimensions of the image information feature map.

In the foregoing implementations, the image information feature map is obtained first, and then the feature map of the spatial position coordinate information is obtained based on the image information feature map. In this way, the number of dimensions is identical between the two types of feature maps, thereby facilitating subsequent image processing and improving accuracy of defect detection.

In some possible implementations, the processing unit is configured to: generate a linear value corresponding to the spatial position coordinate information; generate a first coordinate network based on the linear value; and increase the number of dimensions of the first coordinate network based on the image information feature map, so as to generate the feature map of the spatial position coordinate information.

In the foregoing implementations, the feature map of the spatial position coordinate information is generated by generating a coordinate network corresponding to the spatial position coordinate information. In this way, the position feature map is spliced into the image information feature map. The combination of the two feature maps enhances sensitivity to the spatial information, and improves accuracy of defect detection.

In some possible implementations, the processing unit is configured to: perform, based on the feature map of the to-be-detected image, defect detection on the to-be-detected image by using a filter model, where the filter model includes a filter configured to process the feature map of the spatial position coordinate information.

In the foregoing implementations, a filter corresponding to the feature map of the spatial position coordinate information is added in subsequent detection, thereby facilitating defect detection and increasing accuracy of defect detection.

In some possible implementations, the filter is a filter of a Pt convolutional layer.

In some possible implementations, the feature map of the spatial position coordinate information includes at least one of a feature map of coordinate information in an x-axis direction, a feature map of coordinate information in a y-axis direction, or a feature map of coordinate information in a z-axis direction.

In the foregoing implementations, by defining that the feature map of the spatial position coordinate information is a feature map of coordinate information in at least one of an x-axis direction, a y-axis direction, or a z-axis direction, this embodiment provides a plurality of space sensitivity types, thereby facilitating defect detection and increasing accuracy of defect detection.

In some possible implementations, the method is used for defect detection of tabs and/or electrode plates.

The foregoing implementations can improve the production efficiency of power batteries when applied to defect detection of tabs/electrode plates in the power batteries.

In some possible implementations, when the apparatus is used for defect detection of tabs, the defect detection of tabs includes detection of defects of a tab fold feature.

Because the tab fold feature is position-sensitive, the foregoing implementation can increase detection accuracy when applied to detection of fold defects.

In some possible implementations, the processing unit is configured to: input the to-be-detected image into a neural network; and extract, through a backbone network of the neural network, a defect feature vector and extract a coordinate information feature corresponding to the defect feature vector, so as to obtain the feature map of the to-be-detected image.

By simultaneously extracting the defect feature vector and the corresponding coordinate feature, the foregoing implementation can improve accuracy of defect detection.

According to a third aspect, a defect detection apparatus is provided. The apparatus includes a processor and a memory. The memory is configured to store a program. The processor is configured to call the program from the memory and run the program to perform the defect detection method according to the first aspect or any one possible implementation of the first aspect.

According to a fourth aspect, a computer-readable storage medium is provided, including a computer program. When executed on a computer, the computer program causes the computer to perform the defect detection method according to the first aspect or any one possible implementation of the first aspect.

According to a fifth aspect, a computer program product that includes an instruction is provided. When executed by a computer, the instruction causes the computer to perform the defect detection method according to the first aspect or any one possible implementation of the first aspect.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

DETAILED DESCRIPTION OF EMBODIMENTS

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

Embodiments of this application are applicable to an image processing system, including but not limited to a product based on infrared imaging. The defect detection system is applicable to various electronic devices with a defect detection apparatus. The electronic devices may be a personal computer, computer workstation, smartphone, tablet computer, smart camera, media consumer device, wearable device, set-top box, game console, augmented reality (AR)/virtual reality (VR) device, in-vehicle terminal, or the like, without being limited in disclosed embodiments of this application.

Understandably, specific examples given herein are merely intended to help a person skilled in the art understand embodiments of this application more clearly, but not to limit the scope of embodiments of this application.

Understandably, in various embodiments of this application, the sequence number of a step does not mean the implementation order of the step. The implementation order of each step depends on its functionality and intrinsic logic, but does not constitute any limitation on the implementation process of an embodiment of this application.

Understandably, various embodiments described in this specification may be implemented alone or in combination, without being limited herein.

Unless otherwise defined, all technical and scientific terms used herein bear the same meanings as what is normally understood by a person skilled in the technical field of this application. The terms used herein are merely intended to describe specific embodiments but not to limit the scope of this application. The term "and/or" used herein includes any and all combinations of one or more relevant items recited.

Figure 1:
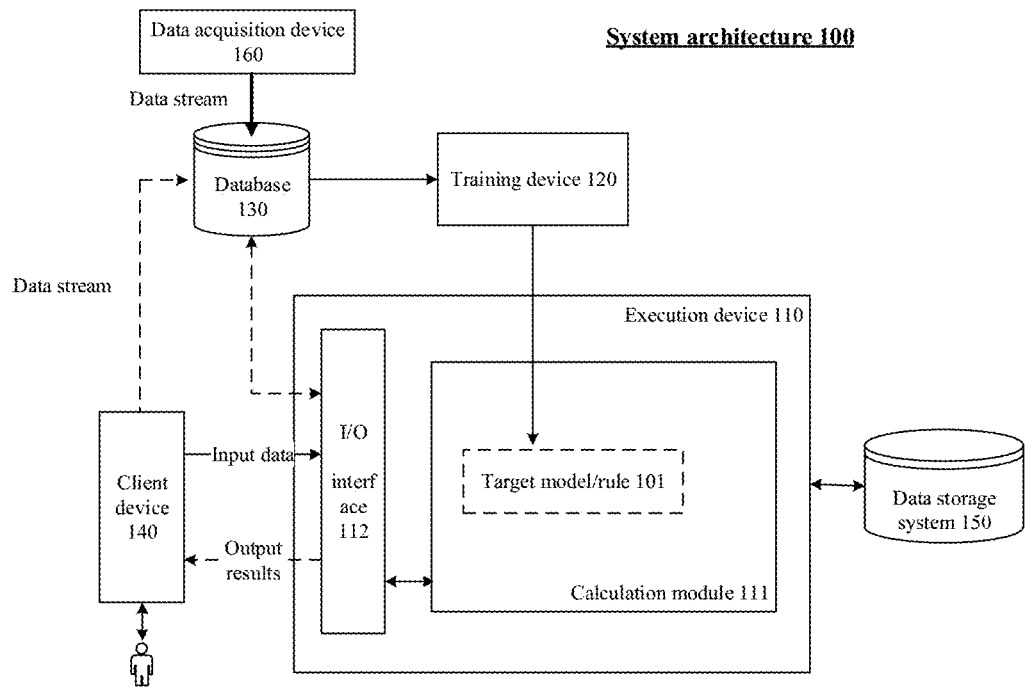
FIG. 1 is a schematic structural diagram of a system architecture according to this application.

For a better understanding of the technical solutions of this application, the following first briefly describes, with reference to FIG. 1, possible scenarios in which an embodiment of this application is applicable.

As shown in FIG. 1, an embodiment of this application provides a system architecture 100. In FIG. 1, a data acquisition device 160 is configured to acquire an known defect specimen image. In the defect detection method according to this embodiment of this application, the known defect specimen image may be a specimen image that includes one or more defects, and the types of the defects in the specimen image are known.

After acquiring the known defect specimen image, the data acquisition device 160 stores the known defect specimen image into the database 130. A training device 120 performs training based on the known defect specimen image maintained in the database 130, so as to obtain a target model/rule 101.

The target model/rule 101 is used for implementing the defect detection method according to an embodiment of this application. The target model/rule 101 according to an embodiment of this application may specifically be a neural network. It is hereby noted that in practical applications, the known defect specimen images maintained in the database 130 are not necessarily all acquired by the data acquisition device 160, but may be received from another device. In addition, it is hereby noted that the training device 120 does not necessarily train the target model/rule 101 totally based on the known defect specimen images maintained in the database 130, but may train the model based on a known defect specimen image obtained from the cloud or elsewhere. The foregoing description is not a limitation on any embodiment of this application.

The target model/rule 101 trained by the training device 120 may be applied to different systems or devices, for example, applied to an execution device 110 shown in FIG. 1. The execution device 110 may be a terminal, such as a mobile phone terminal, a tablet computer, a notebook computer, or the like, and may be a server, a cloud, or the like. In FIG. 1, the execution device 110 is equipped with an input/output (I/O) interface 112 configured to perform data exchange with an external device. A user may input data to the I/O interface 112 through a client device 140. In this embodiment of this application, the input data may include the to-be-detected image input by the client device 140.

In some implementations, the client device 140 may be the same device as the execution device 110. For example, the client device 140 and the execution device 110 may both be terminal devices.

In some other implementations, the client device 140 may be a device different from the execution device 110. For example, the client device 140 is a terminal device, but the execution device 110 is a cloud, a server, or another device. The client device 140 may interact with the execution device 110 over a communications network based on any communications mechanism or communications standard. The communications network may be a wide area network, a local area network, a point-to-point connection, or the like, or any combination thereof.

A calculation module 111 of the execution device 110 is configured to perform operations based on the input data (such as the to-be-detected image) received by the I/O interface 112. When the calculation module 111 of the execution device 110 performs relevant operations such as calculation, the execution device 110 may call data, code, and the like in a data storage system 150 to perform corresponding operations, and may store the data, instructions, and the like obtained in the corresponding operations into the data storage system 150.

Finally, the I/O interface 112 returns a processing result, such as a defect classification result obtained above, to the client device 140, so as to provide the processing result to the user.

It is hereby noted that the training device 120 may generate a corresponding target model/rule 101 for each different target (or referred to as different task) based on different training data. The corresponding target model/rule 101 may be used for achieving the foregoing target or completing the foregoing task, thereby providing the desired result to the user.

In the situation shown in FIG. 1, the user may manually specify the input data, for example, by performing an operation on an interface provided by the I/O interface 112. In another circumstance, the client device 140 may automatically send the input data to the I/O interface 112. If the automatic sending of the input data by the client device 140 is subject to the user's permission, the user may set a corresponding permission in the client device 140. The user can view, on the client device 140, a result output by the execution device 110, and the result is rendered by means of display, sound, action, or the like. The client device 140 may serve as a data acquisition end, and acquires the input data of the input I/O interface 112 and the output result of the output I/O interface 112 as new specimen data, and stores the data in the database 130. Alternatively, instead of acquiring the data by the client device 140, the I/O interface 112 may directly use the input data of the input I/O interface 112 and the output result of the output I/O interface 112 shown in the drawing as new specimen data, and store the specimen data into the database 130.

It is hereby noted that FIG. 1 is merely a schematic diagram of a system architecture according to an embodiment of this application. The positional relationship between the devices, components, modules, and the like shown in the drawing does not constitute any limitation. For example, in FIG. 1, the data storage system 150 is an external memory to the execution device 110. In other circumstances, the data storage system 150 may be installed in the execution device 110.

As shown in FIG. 1, a target model/rule 101 is trained by the training device 120. The target model/rule 101 may be a neural network in this embodiment of this application. Specifically, the neural network in this embodiment of this application may be a convolutional neural network (CNN), a region convolutional neural network (RCNN), or another type of neural network, or the like, without being specifically limited in this application.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned apparatus or component is necessarily located in the specified direction or constructed or operated in the specified direction. Therefore, such terms are not to be understood as a limitation on this application. In addition, the terms "first", "second", "third", and so on are merely used for descriptive purposes, but not construed as indicating or implying relative importance. "Perpendicular" does not means exact perpendicularity, but means perpendicularity falling within an error tolerance range. "Parallel" does not mean exact parallelism, but means parallelism falling within an error tolerance range.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

Power batteries are not only applicable to elementary power systems such as hydro, wind, thermal, and solar power stations, but also widely used in electric means of transport such as electric bicycles, electric motorcycles, and electric vehicles, and in many other fields such as military equipment and aerospace. The market demand for power batteries keeps increasing with the increase of the fields to which the power batteries are applicable. In a production process of a power battery, different defects may occur in a plurality of steps such as anode die-cutting, cathode die-cutting, winding, and gravure coating, and the like. The defects need to be detected automatically by using vision technology, which is known as defect detection. Defect detection usually means detection of surface defects of an object. Surface defect detection is a process of detecting defects such as speckles, dents, scratches, color differences, and breakages on the surface of a workpiece.

Figure 2:
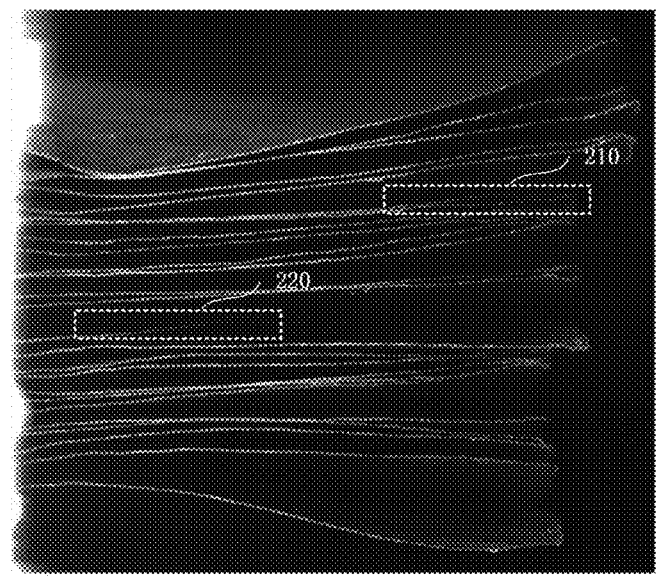
FIG. 2 is a to-be-detected image of a tab of a power battery.

However, due to factors such as a workpiece manufacture process and the structure of the workpiece, some defects are position-sensitive to some extent. Specifically, for similar structures shown in a captured image of the workpiece, when the similar structures are located at different positions of the workpiece, the similar structures at some positions are defects, but the similar structures at other positions are not defects. For example, FIG. 2 shows a to-be-detected image of a tab of a power battery. When fold defects need to be detected in the tab, local features of the fold defect need to be identified in the image first. As shown in FIG. 2, the image includes two basically identical local features 210 and 220. Located at an ending position of the to-be-detected image, the local feature 210 results from the manufacture process of the tab, and is in a normal form. The local feature 220 is located in the middle of the to-be-detected image, with textures disappearing gradually, indicating a fold defect in the middle of the tab. Therefore, of the two local features 210 and 220 that are basically the same, one is in a normal form and not identified as a defect, but the other is a defect and needs to be identified as a defect. In this case, the fold defect of the tab is position-sensitive. In addition, the defect type may vary between different positions.

A conventional detection method does not meet the position-sensitivity requirement of the defect until the neural network technology is used in combination with logic post-processing technology, resulting in relatively low detection efficiency. For example, the neural network is unable to learn how to identify the same local feature at one position as a defect but not as a defect at another position. In this case, the neural network may identify all the local features at different positions as candidate defects, label the forms of the candidate defects manually, and then perform logic post-processing. Therefore, the efficiency of this detection method is relatively low.

In view of this, an embodiment of this application provides a defect detection method. By modifying a neural network structure of defect detection and extracting the feature map of spatial position coordinate information during the detection, this method makes the neural network for use of defect detection sensitive to a spatial position, thereby enhancing sensitivity of a detection neural network to the spatial position, and in turn, increasing accuracy of detecting some specific defect types by the detection neural network, and increasing accuracy of defect detection.

The defect detection method and apparatus according to this embodiment of this application are applicable to, but without limitation, defect detection of power batteries, and are also applicable to defect detection of other types of products in modern industrial manufacturing. The following describes a main process of a defect detection method according to an embodiment of this application with reference to FIG. 3 and FIG. 4.

Figure 3:
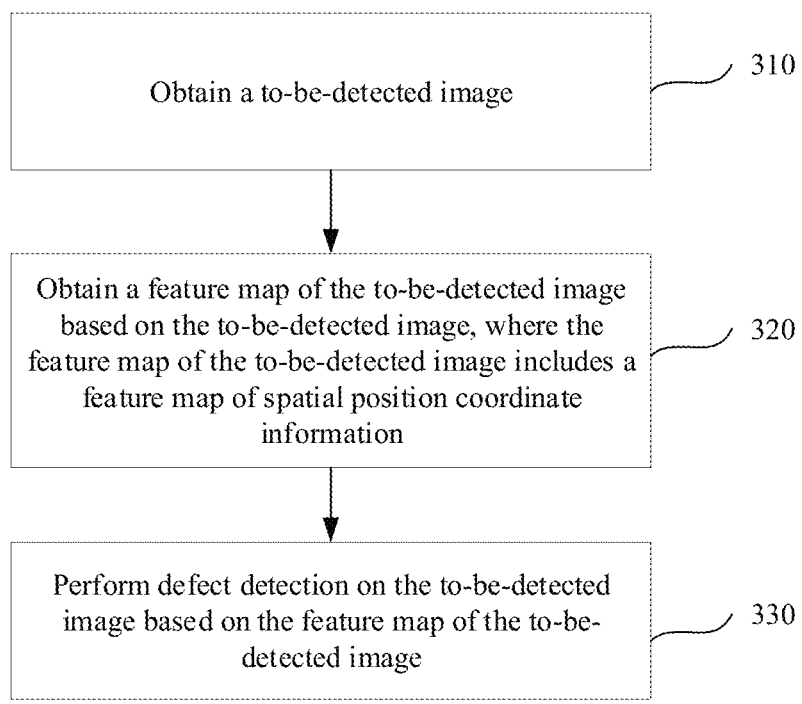
FIG. 3 is a schematic flowchart of a defect detection method according to an embodiment of this application.

FIG. 3 is a schematic flowchart of a defect detection method 300 according to an embodiment of this application. The defect detection method 300 includes the following steps:

310. Obtaining a to-be-detected image.

In this embodiment of this application, the to-be-detected image is a captured image of a to-be-detected workpiece. To be specific, during defect detection for the to-be-detected workpiece, the to-be-detected workpiece may be photographed first to obtain a to-be-detected image. For example, a tab or an electrode plate of a power battery may be photographed to obtain a to-be-detected image of the tab or electrode plate, so as to detect the defect of the tab or electrode plate. A tool used to capture the image may be a charge coupled device (charge coupled device, CCD) camera, or may be another camera or video camera, without being limited herein.

It is hereby noted that a power battery production process generally includes a plurality of production steps. When the power battery is circulated to a last step, the power battery may be photographed by a CCD camera to form a to-be-detected image.

320. Obtaining a feature map of the to-be-detected image based on the to-be-detected image, where the feature map of the to-be-detected image includes a feature map of spatial position coordinate information.

It is hereby noted that in this embodiment of this application, after to-be-detected image is obtained, in order for a neural network to identify whether there is a defect in the to-be-detected image and identify information such as the location of the defect, the to-be-detected image needs to be processed. For example, features are extracted from the to-be-detected image to obtain a feature map of the to-be-detected image. The feature map also includes a feature map of spatial position coordinate information, so that it is convenient to perform subsequent defect detection with reference to the location of the defect.

330. Performing defect detection on the to-be-detected image based on the feature map of the to-be-detected image.

It is hereby noted that in this embodiment of this application, after the feature map of the to-be-detected image is obtained, the feature map may be further processed. For example, whether there is a defect in the to-be-detected image may be determined depending on whether the feature map includes a feature of the corresponding defect, so as to output a detection result. It is also noted that all the foregoing steps may be operated by a machine instead of manual operations, thereby saving manpower and improving production efficiency.

Therefore, in the foregoing method 300, the feature map of spatial position coordinate information is extracted during defect detection, so that the defect detection is performed with reference to the spatial position coordinate information, thereby enhancing sensitivity of a detection neural network to the spatial position, and in turn, increasing accuracy of defect detection.

In step 310, the to-be-detected image may be a captured image of a tab or electrode plate. That is, the defect detection is performed on a tab or electrode plate. For example, the foregoing method 300 is applicable to detecting a tab fold defect. It is hereby noted that, for the tab fold defect, when a similar feature of a fold appears at the ending of a tab image, the fold is not identified as a defect. When a similar feature of a fold appears in the middle of a tab image, the fold is identified as a defect.

In step 320, the feature map of the to-be-detected image includes a feature map of spatial position coordinate information. Optionally, the feature map of the spatial position coordinate information may include at least one of a feature map of coordinate information in an x-axis direction, a feature map of coordinate information in a y-axis direction, or a feature map of coordinate information in a z-axis direction.

In step 320, the feature map of the to-be-detected image may further include an image information feature map. Optionally, the image information feature map is a point feature, line feature, surface feature and/or color feature in the to-be-detected image, or the like.

In an embodiment of this application, the method for obtaining a feature map of the to-be-detected image based on the to-be-detected image in step 320 may be: first, obtaining the image information feature map of the image based on the to-be-detected image, for example, extracting a point feature, line feature, surface feature, and the like from the to-be-detected image; and subsequently, generating a feature map of spatial position coordinate information based on the image information feature map, where the number of dimensions of the image information feature map is identical to the number of dimensions of the feature map of the spatial position coordinate information.

Optionally, a method for generating the feature map of the spatial position coordinate information based on the image information feature map may be: generating linear values corresponding to the spatial position coordinate information, for example, generating linear values of −1 to 1 corresponding to the spatial position; generating a first coordinate network based on the linear values, where the first coordinate network may be a one-dimensional coordinate network or a two-dimensional coordinate network; increasing the number of dimensions of the first coordinate network based on the image information feature map, so as to generate a feature map of the spatial position coordinate information. For example, the number of dimensions of the first coordinate network is increased to the number of dimensions of the obtained point/line/surface feature map, thereby forming a feature map of the spatial position coordinate information, that is, obtaining the position feature. Therefore, the point/line/surface features may be combined with the position feature subsequently to obtain the input of a next convolutional layer.

In an embodiment of this application, a method for obtaining a feature map of the to-be-detected image in step 320 may be: inputting the to-be-detected image into a neural network; and extracting, through a backbone network of the neural network, a defect feature vector and extracting a coordinate information feature corresponding to the defect feature vector, so as to obtain the feature map of the to-be-detected image. The foregoing process may be understood as: the feature map of the to-be-detected image is obtained by extracting features of the neural network, and the defect feature and the coordinate feature corresponding to the defect may be extracted simultaneously during the extraction of features of the neural network.

The model for defect detection on the to-be-detected image based on the feature map of the to-be-detected image in step 330 may be trained by the neural network based on effective defect specimens.

In step 330, the defect detection may be performed on the to-be-detected image based on the feature map of the to-be-detected image by using a filter model. The filter model includes a filter configured to process the feature map of the spatial position coordinate information. In other words, one or more filters corresponding to the spatial position coordinate information are added during the defect detection.

Optionally, the filter is a filter of a $1^{st}$ convolutional layer. To be specific, a channel of spatial position coordinate information is added into the number of input channels of the first convolutional layer, so as to match the feature map of the to-be-detected image. Alternatively, the filter corresponding to the spatial position coordinate information may be a filter of another convolutional layer, such as an it h layer, where i is a positive integer greater than 0.

In an embodiment of this application, when the method 300 is applied to defect detection of a tab, the output detection result may be a serial number of a defective tab and the defect type.

Figure 4:
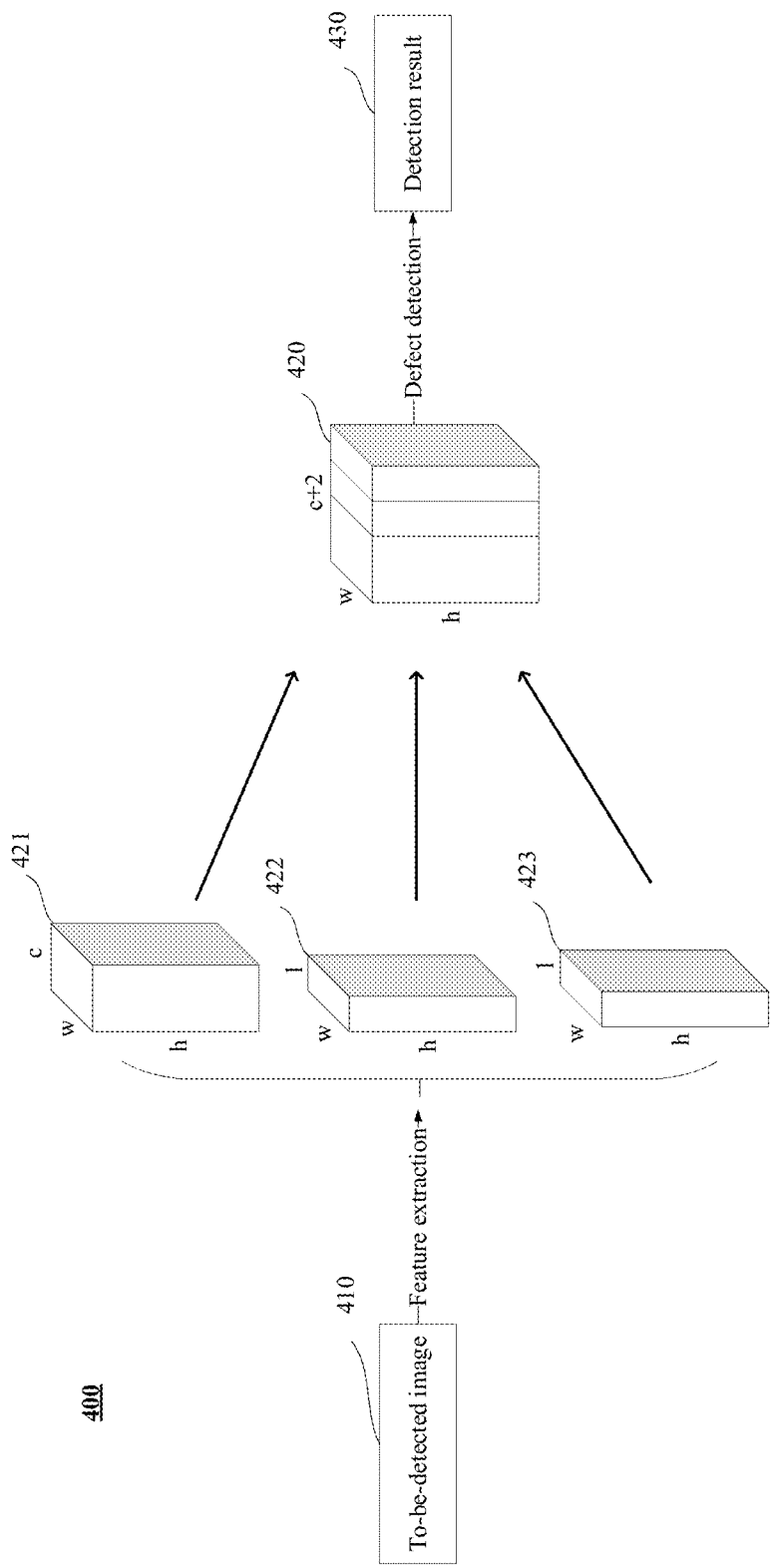
FIG. 4 is a schematic block diagram of a defect detection method according to an embodiment of this application.

To facilitate understanding of the method 300, a defect detection method according to an embodiment of this application is further described below with reference to FIG. 4. FIG. 4 shows a schematic block diagram of a defect detection method 400 according to an embodiment of this application.

It is hereby noted that FIG. 4 includes the same steps as those in the method 300, and reference may be made to the relevant description in the method 300, details of which are omitted here.

As shown in FIG. 4, first, after the to-be-detected image 410 is obtained, features are extracted from the to-be-detected image 410 to obtain an image information feature map 421, a feature map 422 of coordinate information in an x-axis direction, and a feature map 423 of coordinate information in a y-axis direction. The size of the image information feature map 421 is (h, w, c), the size of the feature map 422 of coordinate information in the x-axis direction is (h, w, 1), and the size of the feature map 423 of coordinate information in the y-axis direction is (h, w, 1), where h represents a height of the feature map, w represents a width of the feature map, and both c and 1 represent the number of feature maps. Subsequently, the image information feature map 421, the feature map 422 of coordinate information in the x-axis direction, and the feature map 423 of coordinate information in the y-axis direction are combined to form a feature map 420. The size of the feature map 420 is (h, w, c+2). In other words, after c channels of the image information feature map 421, a channel splicing operation is performed. Specifically, a channel map of coordinate information in the x-axis direction and a channel map of coordinate information in the y-axis direction are spliced to the c channel maps of the image information to form c+2 channel maps, that is, the feature map 420. Finally, defect detection is performed on the formed feature map 420 to output a detection result 430. For example, the obtained feature map 420 may be input into a detector for defect detection, so as to obtain the detection result 430 output by the detection neural network.

It is hereby noted that, for more detailed implementations of obtaining the to-be-detected image 410, performing feature extraction to obtain the feature map 420, and performing defect detection to obtain/output the detection result 430, reference may be made to step 310, step 320, and step 330 in the foregoing method 300, respectively, details of which are omitted here.

Optionally, in an embodiment of this application, in the method for combining the image information feature map with the feature map of the spatial position coordinate information, if just the spatial position coordinate information in the x direction is required, it is just necessary to splice a channel map of coordinate information in the x-axis direction; if just the spatial position coordinate information in the y direction is required, it is just necessary to splice a channel map of coordinate information in the y-axis direction; if both the spatial position coordinate information in the x direction and the spatial position coordinate information in the y direction are required, it is necessary to splice a channel map of coordinate information in the x-axis direction and the channel map of coordinate information in the y-axis direction. After one channel map is spliced, the size of the feature map 420 is (h, w, c+1). After two channel maps are spliced, the size of the feature map 420 is (h, w, c+2). Similarly, after three channel maps are spliced, the size of the feature map 420 is (h, w, c+3). The number of channel maps after splicing is not limited herein.

It is hereby noted that in this embodiment of this application, when the feature map 420 includes the feature map of the spatial position coordinate information after adaptation and optimization, the structure of the corresponding detector also needs to be modified to adapt to the adapted and optimized feature map. For example, when the size of the adapted and optimized feature map is changed from (h, w, c) to (h, w, c+2), the number of filters in the corresponding convolutional layer also needs to be increased by 2.

The foregoing has described in detail the method embodiment according to an embodiment of this application. The following describes an apparatus embodiment according to an embodiment of this application. The apparatus embodiment corresponds to the method embodiment, and therefore, for the content not described in detail in the apparatus embodiment, reference may be made to the preceding method embodiment. The apparatus can implement any possible implementation in the foregoing method.

Figure 5:
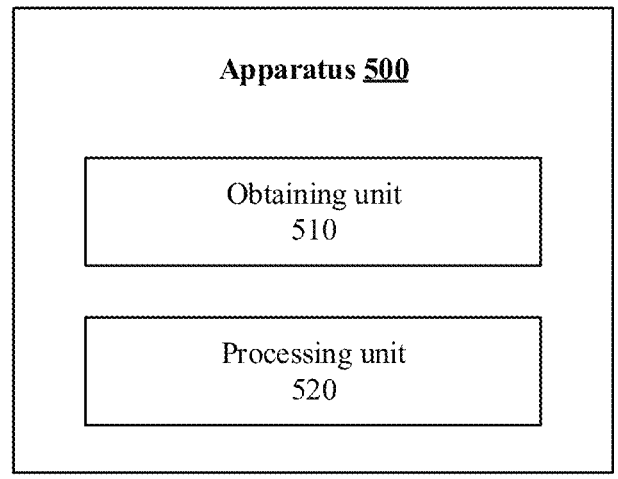
FIG. 5 is a schematic structural block diagram of a defect detection apparatus according to an embodiment of this application.

FIG. 5 is a schematic block diagram of a defect detection apparatus 500 according to an embodiment of this application. The apparatus 500 can execute the foregoing defect detection method according to an embodiment of this application. For example, the apparatus 500 may be the execution device 110 described above.

As shown in FIG. 5, the apparatus includes:
an obtaining unit 520, configured to obtain a to-be-detected image; and
a processing unit 520, configured to: obtain a feature map of the to-be-detected image based on the to-be-detected image, where the feature map of the to-be-detected image includes a feature map of spatial position coordinate information; and perform defect detection on the to-be-detected image based on the feature map of the to-be-detected image.

For more detailed functions of the apparatus 500, reference may be made to the relevant description in the foregoing method embodiment, details of which are omitted here.

Figure 6:
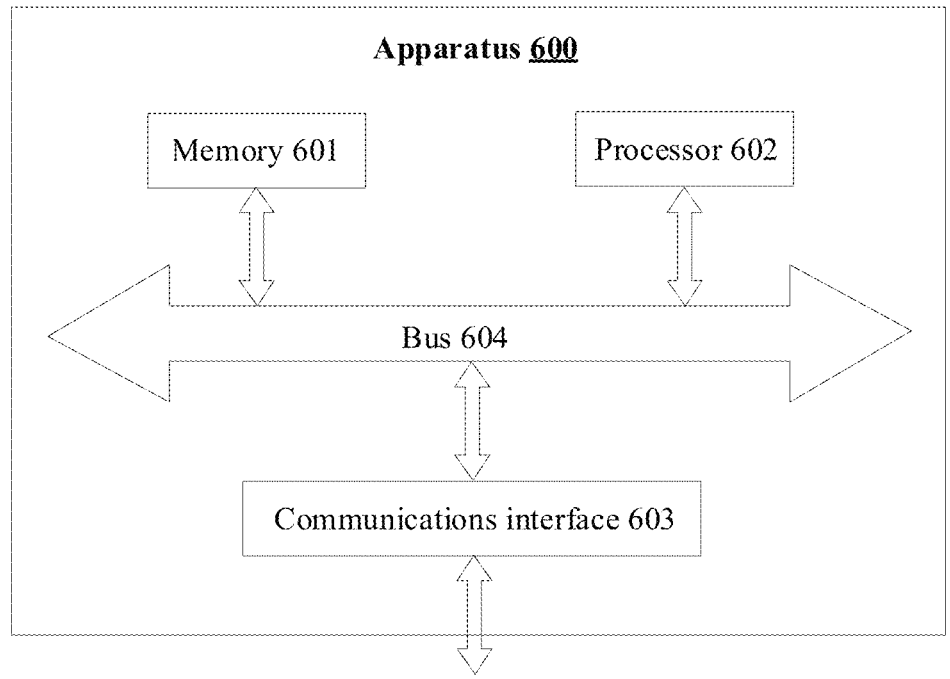
FIG. 6 is a schematic structural hardware diagram of a defect detection apparatus according to an embodiment of this application.

FIG. 6 is a schematic structural hardware diagram of a defect detection apparatus according to an embodiment of this application. The defect detection apparatus 600 shown in FIG. 6 includes a memory 601, a processor 602, a communications interface 603, and a bus 604. The memory 601, the processor 602, and the communications interface 603 are connected to each other by the bus 604 to implement communications connection between each other.

The memory 601 may be a read-only memory (ROM), a static storage device, or a random access memory (RAM). The memory 601 may store a program. When the program stored in the memory 601 is executed by the processor 602, the processor 602 and the communications interface 603 are configured to perform steps of the defect detection method according to an embodiment of this application.

The processor 602 may be a general-purpose central processing unit (CPU), a microprocessor, an application specific integrated circuit (ASIC), a graphics processing unit (GPU), or one or more integrated circuits. The processor is configured to perform relevant programs to implement the functions of units in the defect detection apparatus according to an embodiment of this application or perform the defect detection method according to an embodiment of this application.

Alternatively, the processor 602 may be an integrated circuit chip capable of processing signals. In an implementation process, steps of the defect detection method according to an embodiment of this application may be performed by an integrated logic circuit in the hardware form or an instruction in the software form in the processor 602.

The processor 602 may be a general-purpose processor, a digital signal processor (DSP), an ASIC, a field programmable gate array (FPGA), or another programmable logic device, a discrete gate, or a transistor logic device, or a discrete hardware component. The processor can implement or perform the methods, steps, and logic block diagrams disclosed in an embodiment of this application. The general-purpose processor may be a microprocessor, or the processor may be any conventional processor or the like. The steps of the method disclosed in an embodiment of this application may be directly performed by a hardware processor, or performed by a combination of hardware and software modules in the processor. A software module may be located in a mature storage medium in the art, such as a random access memory, a flash memory, a read-only memory, a programmable read-only memory, an electrically erasable programmable memory, a register, or the like. The storage medium is located in the memory 601. The processor 602 reads the information in the memory 601, and works together with hardware to perform the functions of the units included in the defect detection apparatus according to an embodiment of this application, or perform the defect detection method according to an embodiment of this application.

The communications interface 603 may use, but without limitation, a transmitting and receiving apparatus such as a transceiver to implement communication between the apparatus 600 and another device or a communications network. For example, traffic data of an unknown device may be obtained through the communications interface 603.

The bus 604 may include a path configured to transfer information between components (for example, memory 601, processor 602, and communications interface 603) of the apparatus 600.

It is hereby noted that although the apparatus 600 shown in the drawing includes just a memory, a processor, and a communications interface, a person skilled in the art understands that the apparatus 600 in specific implementations may include other components required for normal operation. In addition, a person skilled in the art understands that the apparatus 600 may further include a hardware component configured to implement another additional function as specifically required. Moreover, a person skilled in the art understands that the apparatus 600 may include just the components necessary to implement an embodiment of this application, but without including all components shown in FIG. 6.

An embodiment of this application further provides a computer-readable storage medium configured to store program code executable by a device. The program code includes an instruction for performing the steps in the defect detection method.

An embodiment of this application further provides a computer program product. The computer program product includes a computer program stored on a computer-readable storage medium. The computer program includes a program instruction. When executed on a computer, the program instruction causes the computer to perform the defect detection method.

The computer-readable storage medium may be a transitory computer-readable medium or a non-transitory computer-readable storage medium.

A person skilled in the art is clearly aware that for convenience and brevity of description, a detailed working process of the apparatus described above may be learned by referring to the corresponding process in the foregoing method embodiment, details of which are omitted here.

In the several embodiments provided in this application, it is understandable that the disclosed apparatus and method may be implemented in other manners. For example, the described apparatus embodiment is merely illustrative. For example, the division of the apparatus into several units is merely a type of logic function division, and the apparatus may be divided in other manners in practical implementations. For example, a plurality of units or components may be combined or integrated into another system, or some features may be ignored or skipped. In addition, the displayed or discussed mutual couplings or direct couplings or communications connections may be implemented through some interfaces. The indirect couplings or communications connections between the apparatuses or units may be implemented in electronic, mechanical or other forms.

The terms used herein are merely used to describe an embodiment but not to limit the claims. Unless otherwise expressly specified in the context, a noun in the singular form preceded by "a", "an", or "the" used in the description of an embodiment or claims is intended to include the plural form of the noun. Similarly, the term "and/or" used herein means any and all possible combinations of one or more relevant items recited. In addition, when used in this application, the terms "include" and "comprise" mean the presence of stated features, entirety, steps, operations, elements, and/or components, but without excluding the presence or addition of one or more other features, entirety, steps, operations, elements, components, and/or any combination thereof.

The aspects, implementation manners, implementations, or features in a described embodiment can be used alone or in any combination. Each aspect of an embodiment described herein may be implemented by software, hardware, or a combination of hardware and software. The described embodiment may be embodied by a computer-readable medium that stores computer-readable code. The computer-readable code includes an instruction executable by at least one computing apparatus. The computer-readable medium may be correlated with any data storage apparatus capable of storing data that is readable by a computer system. Examples of the computer-readable media may include a read-only memory, a random-access memory, a compact disc read-only memory (CD-ROM), a hard disk drive (HDD), a digital video disc (DVD), magnetic tape, an optical data storage device, and the like. The computer-readable medium may be distributed in a computer system connected over a network so that the computer-readable code can be stored and executed in a distributed manner.

The foregoing technical description may be read by reference to the drawings appended hereto. The drawings form a part hereof and have illustrated the implementations in accordance with the described embodiments. Although the embodiments are described in sufficient detail to enable a person skilled in the art to implement the embodiments, the embodiments are non-restrictive so that other embodiments can be used, and changes may be made to the embodiments without departing from the scope of the described embodiments. For example, the order of operations illustrated in a flowchart is non-restrictive, and therefore, the order of two or more operations illustrated in the flowchart and described with reference to the flowchart may be changed according to several embodiments. As another example, in several embodiments, one or more operations illustrated in the flowchart and described with reference to the flowchart are optional or deletable. In addition, some steps or functions may be added to and embodiment disclosed herein, or the order between two or more steps may be permuted. All such variations are considered to be included in the disclosed embodiments and claims.

In addition, terms are used in the foregoing technical description to enable a thorough understanding of the described embodiments. However, undue detail is not required to implement the described embodiments. Therefore, the foregoing description of embodiments is rendered for purposes of interpretation and description. The embodiments rendered in the foregoing description and the examples disclosed according to such embodiments are provided separately to add a context for ease of understanding of the described embodiments. The specification described above is not intended to be exhaustive or to limit the described embodiments to a precise form of this application. Several modifications, alternatives, and variations may be made based on the foregoing teachings. In some circumstances, well-known process steps have not been described in detail in order not to unnecessarily obscure the described embodiments. Although this application has been described with reference to illustrative embodiments, various improvements may be made to the embodiments without departing from the scope of this application, and the components in this application may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A defect detection method, characterized in that the method comprises:
    obtaining a to-be-detected image;
    obtaining a feature map of the to-be-detected image based on the to-be-detected image, wherein the feature map of the to-be-detected image comprises a feature map of spatial position coordinate information; and
    performing defect detection on the to-be-detected image based on the feature map of the to-be-detected image; and, wherein the feature map of the to-be-detected image further comprises an image information feature map, and the obtaining a feature map of the to-be-detected image based on the to-be-detected image comprises:
    obtaining the image information feature map based on the to-be-detected image; and
    generating the feature map of the spatial position coordinate information based on the image information feature map, wherein a number of dimensions of the feature map of the spatial position coordinate information is identical to a number of dimensions of the image information feature map; and, wherein generating the feature map of the spatial position coordinate information based on the image information feature map comprises:
    generating a linear value corresponding to the spatial position coordinate information;
    generating a first coordinate network based on the linear value; and
    increasing a number of dimensions of the first coordinate network based on the image information feature map, so as to generate the feature map of the spatial position coordinate information.

2. The method according to claim 1, characterized in that the performing defect detection on the to-be-detected image based on the feature map of the to-be-detected image comprises:
    performing, based on the feature map of the to-be-detected image, defect detection on the to-be-detected image by using a filter model, wherein the filter model comprises a filter configured to process the feature map of the spatial position coordinate information.

3. The method according to claim 2, characterized in that the filter is a filter of a $1^{st}$ convolutional layer.

4. The method according to claim 1, characterized in that the feature map of the spatial position coordinate information comprises at least one of a feature map of coordinate information in an x-axis direction, a feature map of coordinate information in a y-axis direction, or a feature map of coordinate information in a z-axis direction.

5. The method according to claim 1, characterized in that the method is used for defect detection of tabs and/or electrode plates.

6. The method according to claim 5, characterized in that when the method is used for defect detection of tabs, the defect detection of tabs comprises detection of defects of a tab fold feature.

7. The method according to claim 1, characterized in that the obtaining a feature map of the to-be-detected image based on the to-be-detected image comprises:
    inputting the to-be-detected image into a neural network; and
    extracting, through a backbone network of the neural network, a defect feature vector and extracting a coordinate information feature corresponding to the defect feature vector, so as to obtain the feature map of the to-be-detected image.

8. A defect detection apparatus, characterized in that the apparatus comprises:
    an obtaining unit, configured to obtain a to-be-detected image; and
    a processing unit, configured to obtain a feature map of the to-be-detected image based on the to-be-detected image, wherein the feature map of the to-be-detected image comprises a feature map of spatial position coordinate information, wherein
    the processing unit is further configured to perform defect detection on the to-be-detected image based on the feature map of the to-be-detected image; and, wherein the feature map of the to-be-detected image further comprises an image information feature map, and the obtaining a feature map of the to-be-detected image based on the to-be-detected image comprises:
  obtaining the image information feature map based on the to-be-detected image; and
  generating the feature map of the spatial position coordinate information based on the image information feature map, wherein a number of dimensions of the feature map of the spatial position coordinate information is identical to a number of dimensions of the image information feature map; and, wherein generating the feature map of the spatial position coordinate information based on the image information feature map comprises:
  generating a linear value corresponding to the spatial position coordinate information;
  generating a first coordinate network based on the linear value; and
  increasing a number of dimensions of the first coordinate network based on the image information feature map, so as to generate the feature map of the spatial position coordinate information.

9. A defect detection apparatus, characterized in that the apparatus comprises a processor and a memory, the memory is configured to store a program, and the processor is configured to call the program from the memory and run the program to perform a defect detection method, wherein the method comprises:
  obtaining a to-be-detected image;
  obtaining a feature map of the to-be-detected image based on the to-be-detected image, wherein the feature map of the to-be-detected image comprises a feature map of spatial position coordinate information; and
  performing defect detection on the to-be-detected image based on the feature map of the to-be-detected image; and, wherein the feature map of the to-be-detected image further comprises an image information feature map, and the obtaining a feature map of the to-be-detected image based on the to-be-detected image comprises:
  obtaining the image information feature map based on the to-be-detected image; and
  generating the feature map of the spatial position coordinate information based on the image information feature map, wherein a number of dimensions of the feature map of the spatial position coordinate information is identical to a number of dimensions of the image information feature map; and, wherein generating the feature map of the spatial position coordinate information based on the image information feature map comprises:
  generating a linear value corresponding to the spatial position coordinate information;
  generating a first coordinate network based on the linear value; and
  increasing a number of dimensions of the first coordinate network based on the image information feature map, so as to generate the feature map of the spatial position coordinate information.

10. A non-transitory computer-readable storage medium, characterized in that the storage medium comprises a computer program, and, when executed on a computer, the computer program causes the computer to perform a defect detection method, wherein the method comprises:
  obtaining a to-be-detected image;
  obtaining a feature map of the to-be-detected image based on the to-be-detected image, wherein the feature map of the to-be-detected image comprises a feature map of spatial position coordinate information; and
  performing defect detection on the to-be-detected image based on the feature map of the to-be-detected image; and, wherein the feature map of the to-be-detected image further comprises an image information feature map, and the obtaining a feature map of the to-be-detected image based on the to-be-detected image comprises:
  obtaining the image information feature map based on the to-be-detected image; and
  generating the feature map of the spatial position coordinate information based on the image information feature map, wherein a number of dimensions of the feature map of the spatial position coordinate information is identical to a number of dimensions of the image information feature map; and, wherein generating the feature map of the spatial position coordinate information based on the image information feature map comprises:
  generating a linear value corresponding to the spatial position coordinate information;
  generating a first coordinate network based on the linear value; and
  increasing a number of dimensions of the first coordinate network based on the image information feature map, so as to generate the feature map of the spatial position coordinate information.

* * * * *